(12) United States Patent
Waskie et al.

(10) Patent No.: US 10,100,565 B2
(45) Date of Patent: Oct. 16, 2018

(54) ACTIVE HOOD HINGE WITH UPSTOP

(71) Applicant: GM GLOBAL TECHNOLOGY OPERATIONS LLC, Detroit, MI (US)

(72) Inventors: David B. Waskie, Farmington Hills, MI (US); David E. Thomas, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 96 days.

(21) Appl. No.: 15/387,696

(22) Filed: Dec. 22, 2016

(65) Prior Publication Data

US 2018/0179799 A1 Jun. 28, 2018

(51) Int. Cl.
| | |
|---|---|
| *B60J 7/00* | (2006.01) |
| *E05F 3/20* | (2006.01) |
| *B62D 25/12* | (2006.01) |
| *E05D 11/06* | (2006.01) |
| *E05D 15/48* | (2006.01) |
| *E05D 11/00* | (2006.01) |

(52) U.S. Cl.
CPC ............... *E05F 3/20* (2013.01); *B62D 25/12* (2013.01); *E05D 11/06* (2013.01); *E05D 15/48* (2013.01); *E05D 2011/009* (2013.01); *E05Y 2900/536* (2013.01)

(58) Field of Classification Search
CPC . E05F 3/20; E05D 11/06; E05D 15/48; E05D 2011/009; B62D 25/12; E05Y 2900/536
USPC .................................................... 296/193.11
See application file for complete search history.

(56) References Cited

U.S. PATENT DOCUMENTS

| | | | | |
|---|---|---|---|---|
| 6,439,330 | B1* | 8/2002 | Paye ....................... | B60R 21/38 180/274 |
| 6,789,834 | B2* | 9/2004 | Schlegel ................. | E05D 3/145 296/136.04 |
| 6,892,843 | B2* | 5/2005 | Schillaci ................. | E05C 17/24 180/274 |
| 7,195,090 | B2* | 3/2007 | Parks ...................... | B60R 21/38 180/271 |
| 7,730,990 | B2* | 6/2010 | Boggess ................. | B60R 21/38 180/274 |
| 7,857,087 | B2* | 12/2010 | Matsuura ................ | B60R 21/02 180/274 |
| 7,913,795 | B2* | 3/2011 | Borg ....................... | B60R 21/38 180/274 |
| 7,926,603 | B2* | 4/2011 | Bonsen ................... | B62D 25/12 180/69.21 |

(Continued)

*Primary Examiner* — Jerry E Redman
(74) *Attorney, Agent, or Firm* — Quinn IP Law

(57) ABSTRACT

A hinge assembly for attaching a hood to a body of a vehicle includes a body-side bracket fixedly attached to the body and a hood-side bracket fixedly attached to the hood. A pivot mechanism is configured to place the hinge assembly in: a stowed position, in which the hood is adjacent the body; an access position, in which the hood rotates toward a rear of the vehicle; and an active position, in which the hood rotates toward a front of the vehicle. The hinge assembly also includes an actuator that configured to move the pivot mechanism to, or toward, the active position. A pin is attached to the body-side bracket and an upstop link is attached to the hood-side bracket. The upstop link defines a slot. The pin becomes engaged with the slot when the pivot mechanism is in the active position.

13 Claims, 3 Drawing Sheets

(56) References Cited

U.S. PATENT DOCUMENTS

| | | | | |
|---|---|---|---|---|
| 7,946,376 B2* | 5/2011 | Hayashi | ............... | B60R 21/38 180/274 |
| 8,534,410 B2* | 9/2013 | Nakaura | ............... | B60R 21/38 180/274 |
| 9,481,340 B2* | 11/2016 | Kim | ............... | B60R 21/34 |
| 9,855,916 B2* | 1/2018 | Hwang | ............... | B60R 21/38 |
| 2002/0011365 A1* | 1/2002 | Sasaki | ............... | B60R 21/38 180/69.2 |
| 2007/0267892 A1* | 11/2007 | Scheuch | ............... | B60R 21/38 296/187.04 |
| 2008/0156556 A1* | 7/2008 | Takahashi | ............... | B60R 21/38 180/69.21 |
| 2009/0223360 A1* | 9/2009 | Aoki | ............... | B60R 21/38 92/15 |
| 2009/0229901 A1* | 9/2009 | Aoki | ............... | B60R 21/38 180/69.21 |
| 2009/0302644 A1* | 12/2009 | Mori | ............... | B60R 21/38 296/193.11 |
| 2010/0294584 A1* | 11/2010 | Yuasa | ............... | B60R 21/38 180/274 |
| 2011/0031056 A1* | 2/2011 | Takahashi | ............... | B60R 21/38 180/274 |
| 2014/0132036 A1* | 5/2014 | Fritzon | ............... | B62D 25/105 296/193.11 |
| 2016/0016533 A1* | 1/2016 | Lindmark | ............... | B60R 21/38 296/193.11 |
| 2017/0259776 A1* | 9/2017 | McLundie | ............... | B60R 21/38 |
| 2018/0057068 A1* | 3/2018 | Leschnik | ............... | B62D 25/12 |

\* cited by examiner

ACTIVE HOOD HINGE WITH UPSTOP

INTRODUCTION

This disclosure generally relates to hinges for vehicle hoods or bonnets. Many vehicles include a hood or bonnet covering an engine, electric motors, or other powertrain components. The hood is generally a hinged cover that is selectively movable to provide access to the compartment, and may be formed from metal, plastic, or composite materials.

SUMMARY

A hinge assembly for attaching a hood to a body of a vehicle is provided. The hinge assembly includes a body-side bracket fixedly attached to the body and a hood-side bracket fixedly attached to the hood.

A pivot mechanism is included and is configured to place the hinge assembly in a stowed position, an access position, and an active position. In the stowed position, the hood is adjacent the body; in the access position, the hood rotates toward a rear of the vehicle; and in the active position, the hood rotates toward a front of the vehicle.

The hinge assembly also includes an actuator that is configured to move the pivot mechanism to, or toward, the active position. A pin is attached to the body-side bracket and an upstop link is attached to the hood-side bracket. The upstop link defines a slot. The pin becomes engaged with the slot when the pivot mechanism is in the active position, such that further movement of the hood-side bracket relative to the pin and the body-side bracket is restrained.

In some configurations of the hinge assembly, the slot of the upstop link may be tapered, such that it applies a progressive force to the pin as the pivot mechanism moves from the stowed position to the active position. Other configurations further include a deploy link. The hood-side bracket may be rigidly joined to the deploy link in the access position and the stowed position, and the hood-side bracket may be disengaged from the deploy link in the active position. The hinge assembly may not include a tether joining any of the body, the hood, the body-side bracket, the hood-side bracket, and the deploy link.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
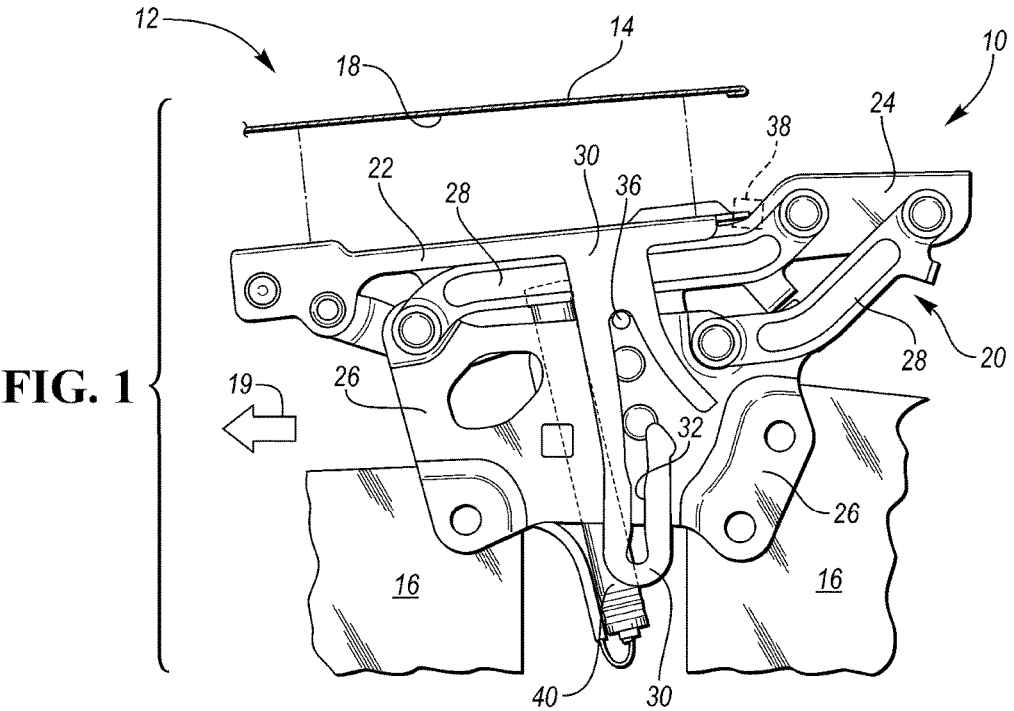
FIG. 1 is a schematic, side view of a hinge assembly for a vehicle, shown in a stowed position, such that a hood of the vehicle is generally adjacent a body of the vehicle.

In the drawings, like reference numbers correspond to like or similar components whenever possible throughout the several figures. There is shown in FIG. 1 a hinge assembly 10 for a vehicle 12, only a portion of which is shown.

The hinge assembly 10 attaches a hood 14 to a body 16 of the vehicle 12. The hood 14 generally covers or closes a compartment 18 or boot of the vehicle 12. A forward direction 19 points toward the front of the vehicle 12 in typical installations of the hinge assembly 10, such that the leftward side of the figures is generally toward the front of the vehicle 12 and the rightward side is generally toward the rear of the vehicle 12. FIG. 1 shows the hinge assembly 10 in a stowed position, such that the hood 14 is generally adjacent or proximate the body 16.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The vehicle 12 may be representative of numerous types vehicles, including planes, trains, and automobiles. Additionally, heavy industrial, construction, and mining equipment may incorporate features of the vehicle 12 or the hinge assembly 10 described herein. The terms front and rear, as used herein as descriptors or as directions, are relative to the typical direction of travel of the vehicle 12. The hinge assembly 10 may also be used in non-vehicular applications or configurations.

As shown in the figures, the hinge assembly 10 includes a pivot mechanism 20 between the hood 14 and the body 16. The pivot mechanism 20 is rotatably attached to a hood-side bracket 22, which is fixedly attached to the hood 14. Note that the exact connections between the hood 14 and the hood-side bracket 22 are not illustrated in the figures. The pivot mechanism 20 also includes a deploy link 24, which is not directly attached to the hood 14.

A body-side bracket 26 is fixedly attached to the body 16 and rotatably attached to the pivot mechanism 20. A plurality of links or bars 28 allow rotation between the hood-side bracket 22 and the body-side bracket 26, including a short bar and a long bar, either of which may alternatively be referred to as a first bar and a second bar.

Figure 2:
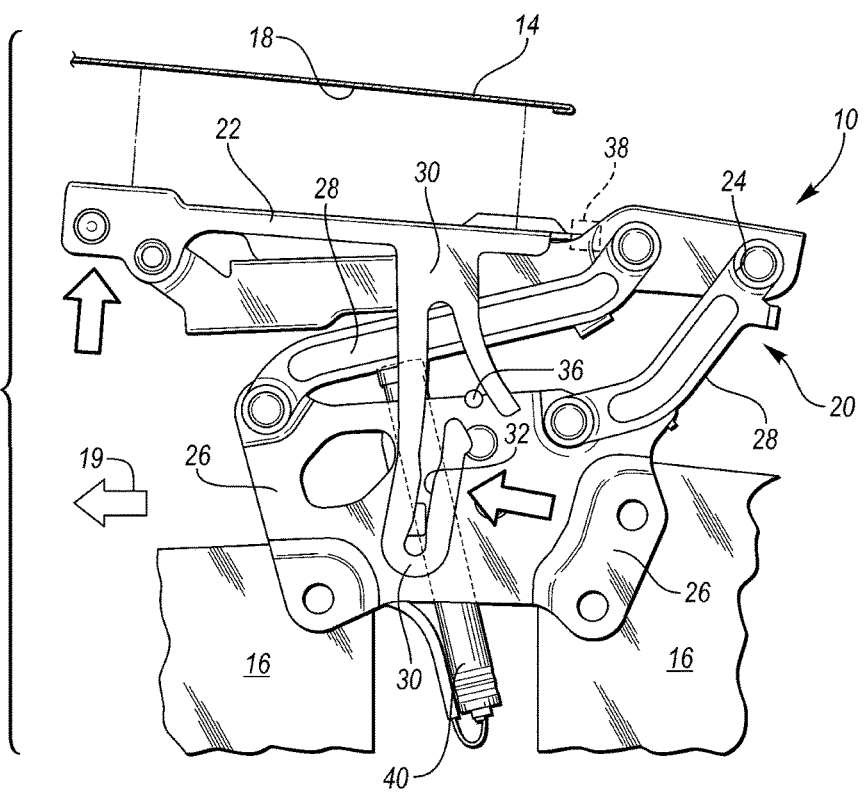
FIG. 2 is a schematic, side view of the hinge assembly of FIG. 1, shown moved partially toward an access position in which the hood rotates toward the rear of the vehicle, such that an operator may gain access to a compartment underneath the hood.
Figure 3:
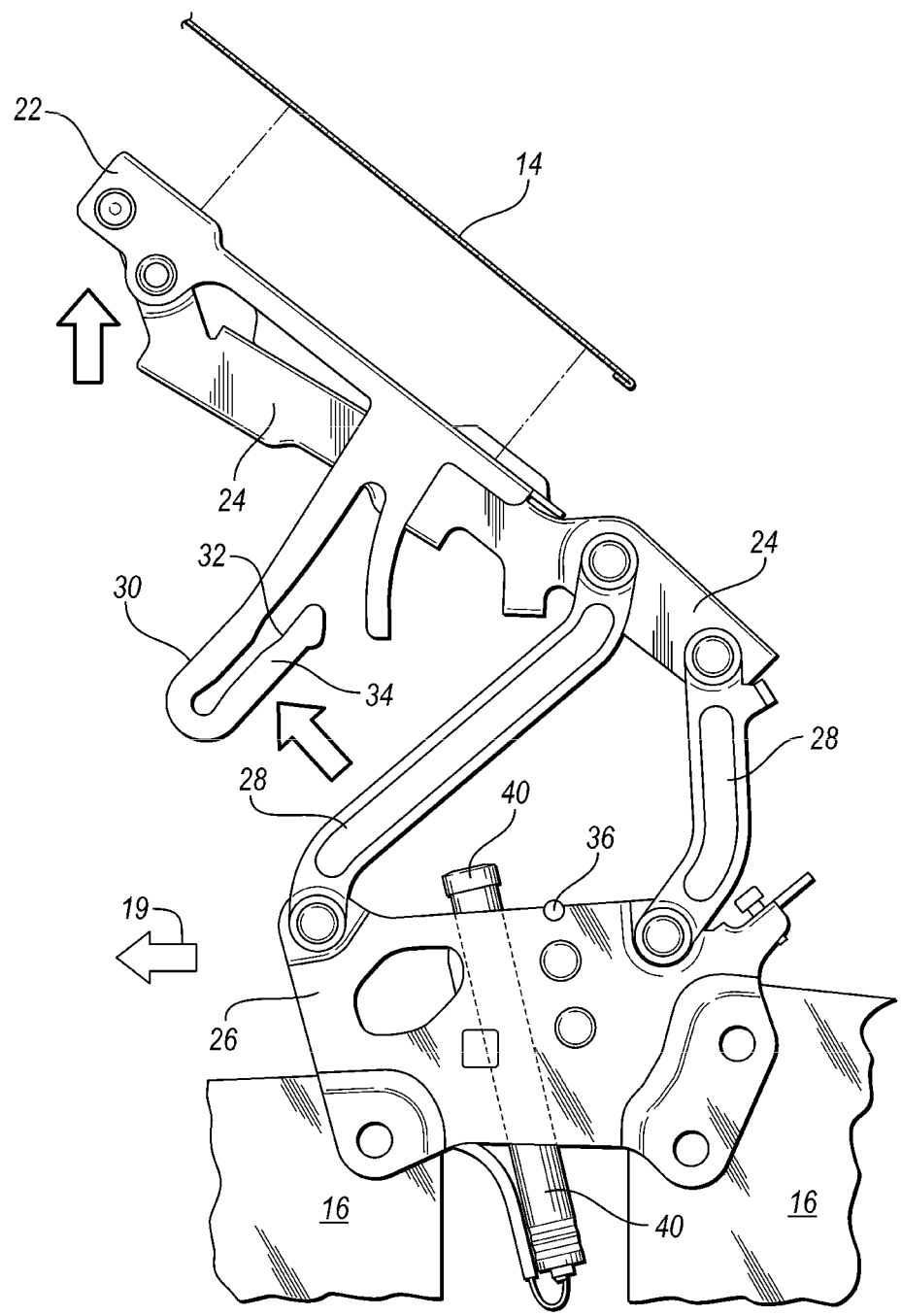
FIG. 3 is a schematic, side view of the hinge assembly of FIG. 1, shown substantially in the access position, such that the operator has access to the compartment underneath the hood.

Referring also to FIG. 2 and to FIG. 3, there are shown additional views of the hinge assembly 10, illustrating one mode of actuation for the pivot mechanism 20. FIG. 1 shows the pivot mechanism 20 in a stowed position in which the hood 14 is adjacent the body 16. FIG. 2 shows the pivot mechanism 20 moving partially to an access position in which the hood 14 rotates toward, or is positioned nearer, a rear of the vehicle 12; and FIG. 3 shows the pivot mechanism 20 moved to the access position, such that an operator of the vehicle 12 has access to the compartment 18 and portions of the body 16 beneath the hood 14.

In order to move from the stowed position, as shown in FIG. 1, to the access position, as shown in FIG. 3, a latch (not shown) at the front of the hood 14 is released allowing the operator to lift and rotate the hood 14. The access position allows an operator of the vehicle 12 to view and access the compartment 18 from the front or forward sides of the vehicle 12, such as for service or diagnostics. In the view shown in FIG. 2 and FIG. 3, the pivot mechanism 20 rotates the hood-side bracket 22 clockwise, such that the front of the hood 14 lifts and the hood 14 rotates clockwise toward the rear of the vehicle 12.

Figure 4:
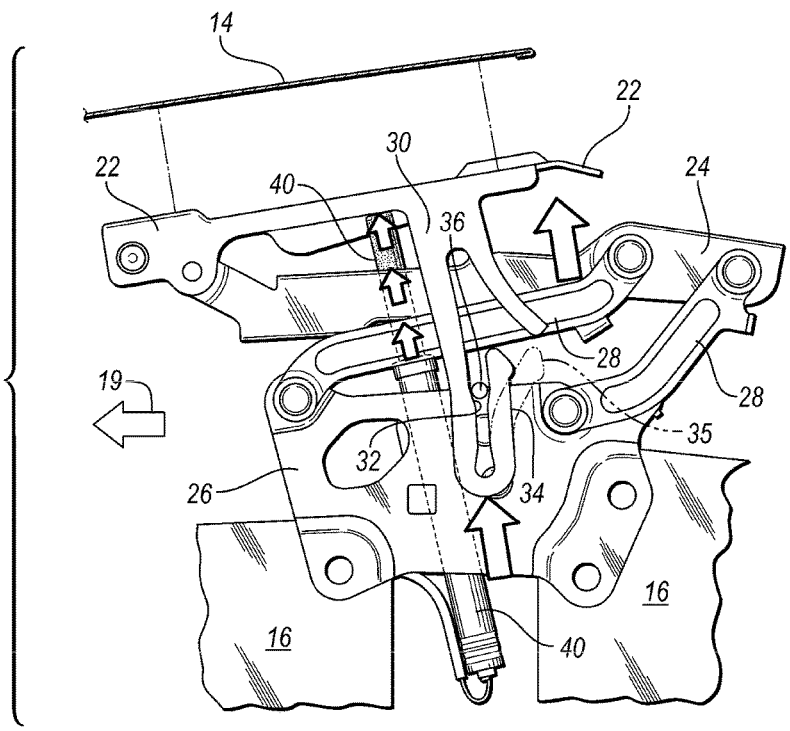
FIG. 4 is a schematic, side view of the hinge assembly of FIG. 1, shown moved partially toward an active position, such that the hood is actuated away from the compartment and rotated toward the front of the vehicle.
Figure 5:
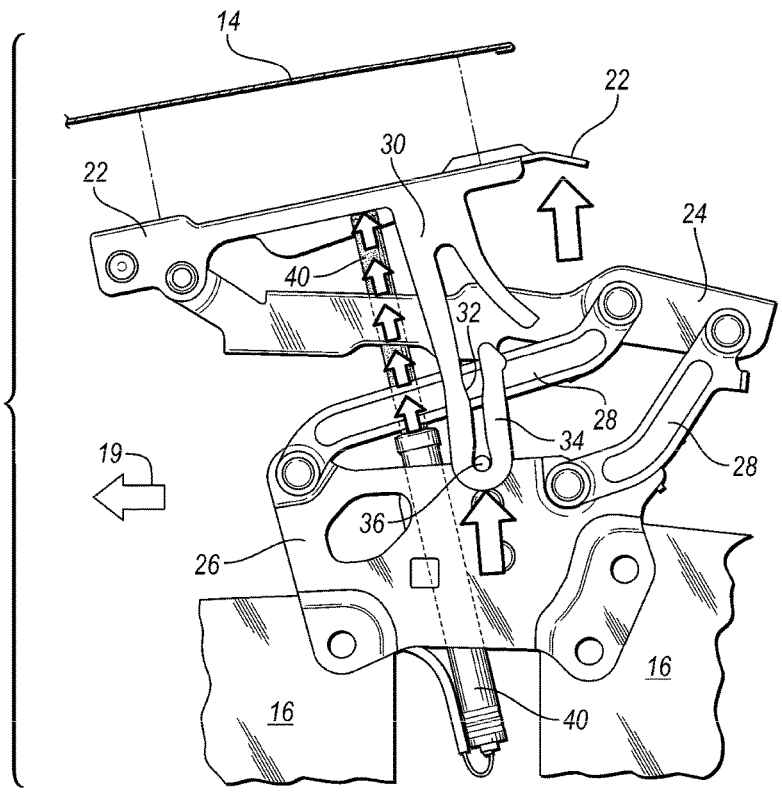
FIG. 5 is a schematic, side view of the hinge assembly of FIG. 1, shown fully the active position, such that further movement of the hood away from the compartment is restrained by an upstop link.

Referring also to FIG. 4 and FIG. 5, there are shown additional views of the hinge assembly 10, illustrating another mode of actuation for the pivot mechanism 20. While FIG. 3 shows the pivot mechanism 20 substantially in the access position, FIG. 4 shows the pivot mechanism partially moved to an active position, and FIG. 5 shows the pivot mechanism 20 substantially in the active position.

In the active position, the hood 14 does not rotate toward, or move closer to, the rear of the vehicle 12, as it does in the access position. Contrarily, in the active position, the hood 14 moves upward and toward the front of the vehicle 12, including some counterclockwise rotation (as viewed in the figures), such that the rotation or movement is opposite that of the access position. The active position may occur in response to contact, or expected contact, of an object with the hood 14.

An upstop link or upstop 30 is attached to, or formed integrally with, the hood-side bracket 22. The upstop 30 defines a limit slot 32 opposite the attachment of the upstop 30 to the hood-side bracket 22. A hook or guide wall 34 partially defines the limit slot 32.

A pin 36 is attached to the body-side bracket 26. Therefore, the pin 36 stays fixed relative to the body 16 as the hood 14 is moved away from the body 16 by the pivot mechanism 20 moving to the active position.

As shown in FIG. 4, as the upstop 30 moves upward relative to the body-side bracket 26, the pin 36 moves toward, or into, the limit slot 32. As shown in FIG. 5, as the pivot mechanism 20 moves to the active position, further movement of the upstop 30 is restrained as the pin 36 fully engages with the limit slot 32.

Comparison between FIGS. 2-3 and FIGS. 4-5 demonstrates interaction, or lack thereof, between the pin 36 and the upstop 30. When the pivot mechanism 20 moves toward the access position, as shown in FIG. 2, the pin 36 swings free from the upstop 30, such that there is no restriction in relative movement between the pin 36 and the upstop 30 in the access position. However, when the pivot mechanism 20 moves to the active position, as shown in FIG. 4, the pin 36 directly engages with the upstop 30 to limit movement of the hood-side bracket 22 relative to the body-side bracket 26.

As shown in FIGS. 1-3, a fastener point 38 joins or attaches the deploy link 24 to the hood-side bracket 22. The fastener point 38 limits movement of the pivot mechanism 20 by connecting the deploy link 24 to the hood-side bracket 22. The fastener point 38 may be, for example and without limitation, a rivet, a bolt, a mechanism, or a welded connection, and may be configured to allow separation of the hood-side bracket 22 from the deploy link 24 under predetermined conditions or loads.

While the fastener point 38 is rigidly attaching the deploy link 24 to the hood-side bracket 22, the pivot mechanism 20 acts as a 4-bar linkage, as shown in FIGS. 2 and 3. The four linkage members are: the shorter bar 28, the longer bar 28, the body-side bracket 26, and the combined or attached deploy link 24 and hood-side bracket 22.

However, upon separation of the hood-side bracket 22 from the deploy link 24, the pivot mechanism 20 acts as a 5-bar linkage, as shown in FIGS. 4-5. The five linkage members are: the shorter bar 28, the longer bar 28, the body-side bracket 26, the deploy link 24, and the, now-separated, hood-side bracket 22.

An actuator 40 is disposed between the body-side bracket 26 and the pivot mechanism 20. The actuator 40 is configured to move the pivot mechanism 20 to the active position. In particular, the actuator 40 acts on the hood-side bracket 22. However, in order to rotate the hood 14 counterclockwise, the hood-side bracket 22 must be separated or freed of its connection to the deploy link 24. Therefore, the actuator 40 disconnects or separates the hood-side bracket 22 from the deploy link 24, such as by removing, severing, or otherwise releasing, the fastener point 38, to place or move the pivot mechanism 20 into the active position.

For the configuration of the hinge assembly 10 shown, the actuator 40 may be a pyrotechnic actuator device. However, other types of actuators 40 may be used to move the pivot mechanism 20 to the active position including, without limitation, electromechanical actuators (such as solenoids), pressurized hydraulic actuators, or mechanical actuators (such as pre-compressed springs or other biasing members).

In an alternative configuration (not shown), a flexible tether may be attached between the hood 14 and the body 16, between the body 16 and the deploy link 24, or between the body-side bracket 26 and the deploy link 24. In such a configuration, the tether would limit the range of movement caused by the actuator 40. However, in the configuration shown, the upstop 30 limits the amount of movement of the hood 14 and the hood-side bracket 22 away from the body 16.

Additionally, the interaction between the limit slot 32 and the pin 36 provides damping capability as movement of the hood 14 is stopped. With a tether configuration, particularly when formed from an inelastic material such as braided wire, the hood 14 immediately stops when the tether is linearly extended. However, the limit slot 32 progressively applies stopping force to the pin 36, such that a (relatively) gradual deceleration occurs between the hood 14 and the body 16.

The shape of the limit slot 32 may be tuned to apply varying levels of resistive force to the pin 36. For example, the limit slot 32 may be tapered, such that it applies a progressive force to the pin 36 as the pivot mechanism 20 moves from the stowed position to the active position. The guide wall 34 may contribute to the force applied to the pin 36 as the guide wall 34 is flexed away from the remainder of the upstop 30.

FIG. 4 also illustrates an alternative guide wall 35 in phantom lines. The alternative guide wall 35 has portions extending further from the remainder of the upstop 30, to accommodate unexpected or wandering movement of the pin 36. The alternative guide wall 35, like the guide wall 34, forms a closed section for retention of the pin 36 within the limit slot 32.

The detailed description and the drawings or figures are supportive and descriptive of the subject matter discussed herein. While some of the best modes and other embodiments for have been described in detail, various alternative designs, configurations, and embodiments exist.

The invention claimed is:

1. A hinge assembly for attaching a hood to a body of a vehicle, comprising:
    a body-side bracket fixedly attached to the body;
    a hood-side bracket fixedly attached to the hood;
    a pivot mechanism configured to place the hinge assembly in:
        a stowed position in which the hood is adjacent the body;
        an access position in which the hood rotates toward a rear of the vehicle; and
        an active position in which the hood rotates toward a front of the vehicle;
    an actuator configured to move the pivot mechanism to the active position;
    a pin attached to the body-side bracket; and
    an upstop link attached to the hood-side bracket and defining a slot, wherein the pin is engaged with the slot when the pivot mechanism is in the active position.

2. The hinge assembly of claim 1, wherein the slot of the upstop link is tapered, such that the slot applies a progressive force to the pin as the pivot mechanism moves from the stowed position to the active position.

3. The hinge assembly of claim 2, further comprising:
    a deploy link,
    wherein the hood-side bracket is rigidly joined to the deploy link in the access position and the stowed position, and
    wherein the hood-side bracket is disengaged from the deploy link in the active position.

4. The hinge assembly of claim 3, wherein the pin is disengaged from the slot when the pivot mechanism is in the access position.

5. The hinge assembly of claim 4, wherein the hinge assembly does not include a tether joining any of the body, the hood, the body-side bracket, the hood-side bracket, and the deploy link.

6. The hinge assembly of claim 5, further comprising:
    a rivet joining the hood-side bracket to the deploy link in the stowed position and the access position, wherein the actuator separates the rivet to disengage the hood-side bracket from the deploy link in the active position.

7. The hinge assembly of claim 6, wherein the actuator is a pyrotechnic actuator.

8. The hinge assembly of claim 1, further comprising:
    a deploy link,
    wherein the hood-side bracket is rigidly joined to the deploy link in the access position and the stowed position, such that the pivot mechanism is a 4-bar linkage in the access position and the stowed position, and
    wherein the hood-side bracket is disengaged from the deploy link in the active position, such that the pivot mechanism is a 5-bar linkage in the active position.

9. The hinge assembly of claim 8, wherein the actuator is a pyrotechnic actuator.

10. A hinge assembly for attaching a hood to a body of a vehicle, comprising:
    a body-side bracket fixedly attached to the body;
    a hood-side bracket fixedly attached to the hood;
    a pivot mechanism configured to place the hinge assembly in:
        a stowed position in which the hood is adjacent the body;
        an access position in which the hood is positioned toward a rear of the vehicle; and
        an active position in which the hood is positioned toward a front of the vehicle;
    an actuator configured to move the pivot mechanism to the active position;
    a deploy link, wherein the hood-side bracket is rigidly joined to the deploy link in the access position and the stowed position, and the actuator separates the hood-side bracket from the deploy link in the active position;
    a pin attached to the body-side bracket; and
    an upstop link attached to the hood-side bracket and defining a slot, wherein the pin is engaged with the slot when the pivot mechanism is in the active position and is disengaged from the slot when the pivot mechanism is in the access position.

11. The hinge assembly of claim 10, further comprising:
    a rivet joining the hood-side bracket to the deploy link in the stowed position and the access position, wherein the actuator separates the rivet to disengage the hood-side bracket from the deploy link in the active position.

12. A hinge assembly for attaching a hood to a body of a vehicle, comprising:
    a body-side bracket fixedly attached to the body;
    a hood-side bracket fixedly attached to the hood;
    a pivot mechanism configured to place the hinge assembly in:
        a stowed position in which the hood is adjacent the body;
        an access position in which the hood rotates toward a rear of the vehicle and the pivot mechanism rotates through a 5-bar linkage; and
        an active position in which the hood rotates toward a front of the vehicle and the pivot mechanism rotates through a 4-bar linkage;
    an actuator configured to move the pivot mechanism to the active position;
    a pin attached to the body-side bracket; and
    an upstop link attached to the hood-side bracket and defining a slot, wherein the pin is engaged with the slot when the pivot mechanism is in the active position.

13. The hinge assembly of claim 12, further comprising:
    a fastener point joining the hood-side bracket to the deploy link in the stowed position and the access position, wherein the actuator separates the fastener point to disengage the hood-side bracket from the deploy link in the active position.

* * * * *